United States Patent
Liang et al.

(10) Patent No.: US 7,475,126 B2
(45) Date of Patent: Jan. 6, 2009

(54) METHOD AND APPARATUS FOR SYSTEM LINEUP AND TESTING

(75) Inventors: Geng-Chen Liang, Ottawa (CA); Jeffrey C Bos, Guelph (CA); Neil J Murphy, Ottawa (CA); Wesley J Anderson, Ottawa (CA); Teodor A Maksimovic, Nepean (CA); Xiao B Wang, Kanata (CA); Damitha K Ranaweera, Nepean (CA); Andrew J Messer, Ottawa (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 1556 days.

(21) Appl. No.: 10/097,586

(22) Filed: Mar. 15, 2002

(65) Prior Publication Data

US 2003/0177205 A1    Sep. 18, 2003

(51) Int. Cl.
*G06F 15/173* (2006.01)
(52) U.S. Cl. .................................... 709/223
(58) Field of Classification Search ................ 709/223; 379/1.01, 1.03, 26.01, 12; 714/25; 370/251, 370/254; 398/1, 9
See application file for complete search history.

(56) References Cited

U.S. PATENT DOCUMENTS

| | | | | |
|---|---|---|---|---|
| 5,796,951 | A * | 8/1998 | Hamner et al. | 709/223 |
| 5,881,143 | A * | 3/1999 | Johnson | 379/177 |
| 5,954,829 | A * | 9/1999 | McLain et al. | 714/712 |
| 5,983,001 | A * | 11/1999 | Boughner et al. | 714/38 |
| 6,154,373 | A * | 11/2000 | Durston et al. | 361/788 |
| 6,229,540 | B1 * | 5/2001 | Tonelli et al. | 715/735 |
| 6,301,336 | B1 * | 10/2001 | Branton et al. | 379/29.01 |
| 6,564,375 | B1 * | 5/2003 | Jiang | 717/165 |
| 6,674,724 | B1 * | 1/2004 | Main et al. | 370/241 |
| 6,725,205 | B1 * | 4/2004 | Weiler et al. | 705/57 |
| 6,778,778 | B1 * | 8/2004 | Richards et al. | 398/14 |
| 6,996,706 | B1 * | 2/2006 | Madden et al. | 713/2 |
| 7,042,880 | B1 * | 5/2006 | Voit et al. | 370/395.1 |
| 7,102,769 | B2 * | 9/2006 | Cox | 358/1.14 |
| 2002/0032790 | A1 * | 3/2002 | Linderman | 709/230 |
| 2002/0083374 | A1 * | 6/2002 | Hinds et al. | 714/47 |

OTHER PUBLICATIONS

Common Photonic Layer. Nortel. http://products.nortel.com/go/product_assoc.jsp?segId=0&parId=0&catId=null&rend_id=1341&contOid=100174375&prod_id=49041&locale=en-US. 2008.*
Betacom Company Profile. http://www.betacominc.com/company-profile/. 2008.*

* cited by examiner

*Primary Examiner*—Andrew Caldwell
*Assistant Examiner*—John M MacIlwinen
(74) *Attorney, Agent, or Firm*—Anne Kinaman; Borden Ladner Gervals LLP (57) ABSTRACT

The present invention provides a method and apparatus for system lineup and testing (SLAT) that is suitable for practical high-density cross-connect implementation. Preferably, a software assistant (wizard) guides a user through the various phases of SLAT in an automated fashion, and is able to co-ordinate tasks in a SLAT session possibly being performed at a plurality of locations such that essential tasks in said SLAT session are completed in proper sequence and some tasks of said SLAT session are performed in parallel. The present invention advantageously provides SLAT with the following benefits: support for both local and remote users; supports for multiple users; facility for users to collaborate; production of a report that is saved for reference, providing a persistent record of session data; permitting users to quit, resume and continue an incomplete session; reporting errors to users; SLAT that may be run locally (stand-alone) or remotely (on a server).

40 Claims, 5 Drawing Sheets

METHOD AND APPARATUS FOR SYSTEM LINEUP AND TESTING

FIELD OF INVENTION

The present invention relates to the testing of new and/or recently changed network elements in a communications system in order to bring the system into a state in which it is able to carry traffic.

BACKGROUND OF THE INVENTION

System Lineup and Testing (SLAT), in general, is the process of bringing a system, which has already been installed at a telecommunications site, into steady-state service capable of carrying traffic. The process also generally applies when expanding an existing, in-service system, by providing a procedure to test new network elements (NEs) before they are added to the system.

For existing optical carrier standards, in-bay testing requires approximately 9 hours to complete and end-to-end testing takes approximately 34 hours. Conventional SLAT processes consist mostly of manual processes. Networks employing high-density cross-connect (HDX) network elements, such as Nortel's OpTera™ Connect HDX, require similar SLAT. However, there is a concern with respect to HDX SLAT in that HDX port density is 96 times that of OC-192. If the same SLAT strategy that has been used for OC-192 were to be used for HDX, the total HDX SLAT time would be in the order of weeks, which is clearly unacceptable to customers. Furthermore, there are many limitations associated with the mostly manual SLAT processes known in the art, many of which allow for errors to be introduced or omissions to be made in the SLAT process. Therefore, a different network element SLAT strategy is required, particularly for use with high-density network elements.

SUMMARY OF INVENTION

The present invention affords the ability to provide an improved SLAT scheme that is suitable for practical implementation with a variety of network elements.

According to an aspect of the invention, there is provided an apparatus for use in a network comprising: means for accepting user input relating to a first set of system lineup and testing (SLAT) tasks for a network element, said first set of SLAT tasks constituting part of a SLAT session; means for guiding a user through tasks of said first set of SLAT tasks in an automated manner; means for transmitting received user input to a network element server; means for performing at least some tasks of said first set of SLAT tasks; means for receiving and displaying network element information from said network element server; and means for coordinating the completion of performed SLAT tasks with a second set of SLAT tasks, said second set of SLAT tasks constituting part of said SLAT session, such that essential tasks in said SLAT session are completed in proper sequence and some tasks of said SLAT session are performed in parallel.

According to another aspect of the invention, there is provided a method, comprising the steps of: accepting user input relating to a first set of system lineup and testing (SLAT) tasks for a network element, said first set of SLAT tasks constituting part of a SLAT session; communicating user information to said network element; guiding a user through tasks of said first set of SLAT tasks in an automated manner; performing at least some tasks of said first set of SLAT tasks; receiving network element information from said network element; and coordinating the completion of performed SLAT tasks with a second set of SLAT tasks, said second set of SLAT tasks constituting part of said SLAT session, such that essential tasks in said SLAT session are completed in proper sequence and some tasks of said SLAT session are performed in parallel.

According to a farther aspect of the invention, there is provided a method of coordinating multiple system lineup and testing (SLAT) activities for one or more network elements, each activity running on a client computer, comprising the steps of: preparing a network element initialization file; providing said initialization file to an apparatus operably connected to said network element as well as to at least one client computer; transferring said initialization file, upon request, to a selected operably connected client computer from which SLAT activities relating to said network element are capable of being initiated; preparing an updated SLAT report file following the completion of a SLAT task; and providing said updated SLAT report file to said apparatus.

According to yet another aspect of the invention, there is provided an apparatus for use in a network comprising: means for receiving user input for a plurality of sets of tasks relating to system lineup and testing (SLAT) for a network element, each of said sets of SLAT tasks originating from a client computer capable of communicating with said network element, said sets of SLAT tasks constituting part of a SLAT session; means for transmitting received user input to a network element server; means for receiving network element information from said network element server; means for performing at least some tasks of said plurality of sets of SLAT tasks; means for transmitting said network element information to said client computer for presentation to a user; and means for coordinating the completion of performed SLAT tasks such that essential tasks in said SLAT session are completed in proper sequence and some tasks of said SLAT session are performed in parallel.

According to a further aspect of the present invention, there is provided a computer program product having a medium with a computer program embodied thereon, the computer program comprising: computer program means for accepting user input relating to a first set of system lineup and testing (SLAT) tasks for a network element, said first set of SLAT tasks constituting part of a SLAT session; computer program means for guiding a user through tasks of said first set of SLAT tasks in an automated manner; computer program means for facilitating transmittal of received user input to a network element server; computer program means for facilitating performance of at least some tasks of said first set of SLAT tasks; computer program means for facilitating receipt of network element information from said network element server; computer program means for facilitating display of said network element information; and computer program means for coordinating the completion of performed SLAT tasks with a second set of SLAT tasks, said second set of SLAT tasks constituting part of said SLAT session, such that essential tasks in said SLAT session are completed in proper sequence and some tasks of said SLAT session are performed in parallel.

According to a yet further aspect of the present invention, there is provided a computer program product having a medium with a computer program embodied thereon, the computer program comprising: computer program means for receiving user input for a plurality of sets of tasks relating to system lineup and testing (SLAT) for a network element, each of said sets of SLAT tasks originating from a client computer, said sets of SLAT tasks constituting part of a SLAT session; computer program means for facilitating transmittal of received user input to a network element server; computer program means for facilitating receipt of network element information from said network element server; computer program means for facilitating performance of at least some tasks of said first set of SLAT tasks; computer program means for facilitating transmittal of said network element information to said client computer for presentation to a user; and computer program means for coordinating the completion of performed SLAT tasks such that essential tasks in said SLAT session are completed in proper sequence and some tasks of said SLAT session are performed in parallel.

According to a still further aspect of the present invention, there is provided a computer program product comprising a computer-readable memory storing statements and instructions for use in the execution in a computer of any of the methods described above.

Among the advantageous features afforded by the present invention are:

SLAT that supports both local and remote users;
SLAT that supports multiple users each performing distinct tasks in the same SLAT session;
SLAT that permits users to collaborate while ensuring that essential tasks are completed in proper sequence and some tasks are performed in parallel;
SLAT that produces a report that is saved for reference, providing a persistent record of session data;
SLAT that permits a user to discontinue, resume and continue an incomplete session; and
SLAT whereby errors are reported to users.

The present invention, in a preferred embodiment, provides a software wizard that allows the user to proceed through the various phases of SLAT while ensuring that no critical step is omitted without displaying a warning.

The present invention may be used with one or many high-density network elements, for which the present invention may provide significant advantages over existing methods and systems. The automated, centralized features of the present invention may also provide advantages for use with lower density network elements.

BRIEF DESCRIPTION OF THE DRAWINGS

Embodiments of the present invention will be further described with reference to the accompanying drawings, in which.

DETAILED DESCRIPTION OF THE INVENTION

HDX SLAT according to the present invention is the process of bringing an HDX cluster, which has already been installed at a Telco site, to a "sane" state. The SLAT mode can be entered at a shelf, quadrant and/or slot level. As such, the HDX SLAT also applies when expanding an existing, in-service HDX NE, or providing a procedure to test a new shelf/quadrant/slot before being added to the in-service HDX NE.

Figure 1:
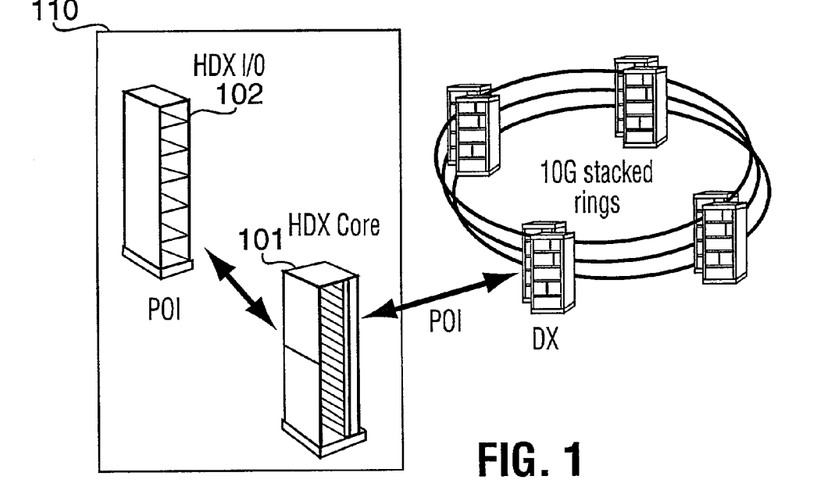
FIG. 1 illustrates an HDX configuration showing a consolidated node and HDX as a DX hub.

FIG. 1 illustrates an HDX configuration showing a consolidated node and HDX as a DX hub. An HDX in the high level view can be configured as: consolidated node 110 (or HDX cluster) composed of: HDX core 101 and HDX I/Os 102; or HDX core shelf 101 acting as a DX hub. The term network element (NE) will be used hereinafter to refer to an HDX cluster, as described above.

To reduce the HDX SLAT time, the present invention facilitates automating SLAT tests, such as: automating site testing (signal continuity testing); automating receive sensitivity testing; automating transmit output power testing; providing a fiber connectivity tool (to verify/troubleshoot fiber connections); guiding a user through SLAT using a SLAT GUI wizard; and storing SLAT test results on the system (thereby eliminating hardcopy SLAT forms).

Embodiments of the present invention seek to simplify test procedures, and yet provide sufficient test coverage so as to advantageously: reduce or eliminate external testsets; use internal testing capability; reduce or eliminate optical loopbacks; minimize fiber manipulation; automate tasks as much as possible; run SLAT remotely (skilled people at remote site) or locally.

The term SLAT "session" as employed herein represents the totality of SLAT tasks necessary for full and complete SLAT of a network element. The term SLAT "activity" as employed herein represents one or more SLAT tasks that may be performed at a particular client computer. The terms tests and tasks are used interchangeably.

When a new HDX NE is being assembled in the field, the process used to bring the NE "live" typically consists of the following steps:

Pre-commissioning checks: tests that are executed on the test equipment brought by the installation team to ensure calibrated and functionally correct results.

NE commissioning: procedures of entering initial data that is required by software to define the configuration of the NE. This rudimentary data allows the NE to carry traffic and interwork with other NEs and a main control center software in the network.

NE software upgrade: procedures of ensuring that the NE is tested against the customer release load. The load can be downloaded from a CD-ROM of the SLAT user's PC, or from an FTP server. The user must specify to the NE from where to download the load.

Site testing: tests that are executed on a single NE node that is configured so as to be independent of the rest of the system. Tests for HDX node include backplane continuity test for HDX core and HDX I/O, optics test for port cards on HDX I/O.

Site testing cluster: tests that are executed on the connection from HDX core to HDX PO with Parallel Optical Interface (POD) cards. These tests would be performed by the system and would rely on a POI interface to test and diagnose problems.

As described earlier, each set of HDX core platform and HDX I/O platform will together be SLATted/managed as a single NE. This will be accomplished by an NE-resident "Network Element Controller" (NC) function. The NC function is preferably achieved via software running on a Shelf Controller (SC) card, although other similar implementations are possible. The software can be installed on a separate external machine or alternatively in the SC card on one of the core shelves.

Parallel Optical Interface (POI) connectivity between the HDX core and the I/O shelves is hidden by the NC function. One command issued to the NE TL1 interface will be capable of testing all platforms (core and I/O) comprising the NE. On the I/O shelf, mapping between the port card facilities within slots 2, 3, and 4 and the POI facilities within slot 1 (connecting back to the core switch) will be wholly managed by the NE and known to the NC. The POI card in slot 1 together with the port cards in slots 2, 3 and 4 will be treated as a quadrant during SLAT.

Figure 2:
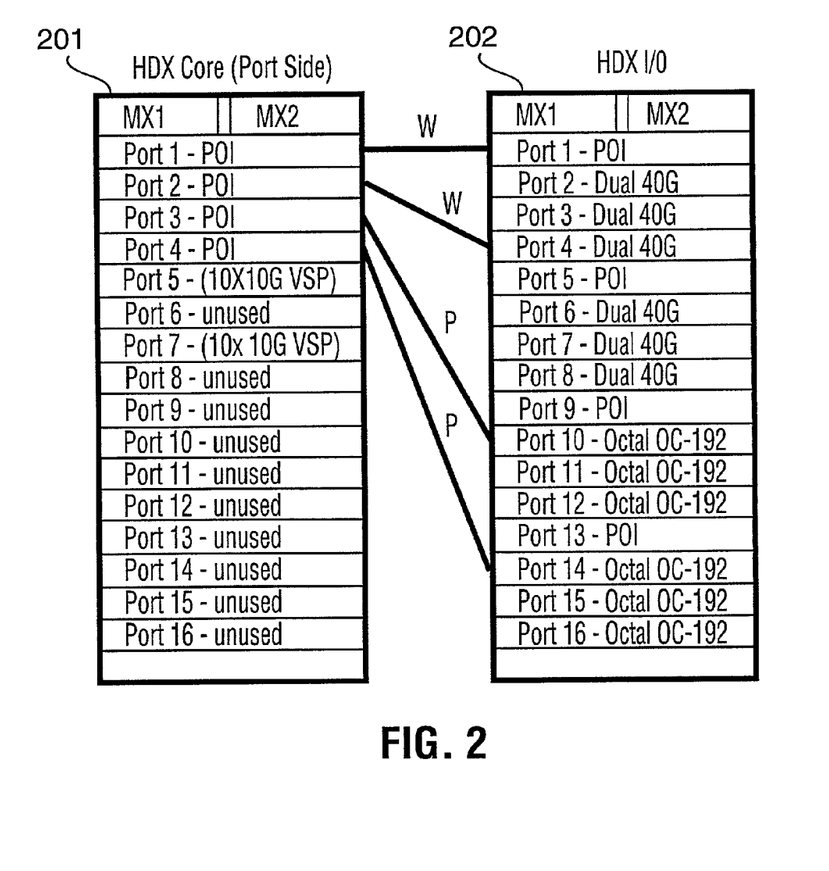
FIG. 2 illustrates an example of an HDX NE configuration according to an embodiment of the present invention.

FIG. 2 illustrates an example of an HDX NE configuration according to the present invention. Interaction and connectivity between ports of the HDX core 201 and the HDX I/O shelves 202 is represented by working lines W and protection lines P.

SLAT Assistant

Nodal SLAT is concerned with getting the NE up and running. The HDX SLAT Assistant is a user-friendly task based application that will step the user through the process of commissioning/provisioning and testing the shelves and the NE. This SLAT Assistant will preferably be installed on an apparatus for performing SLAT tasks, be it a server computer, client computer or other computer, such as a craft PC. (A craft PC is a terminal that is used for on-site installation and maintenance of individual network elements.)

The SLAT Assistant is composed of a SLAT GUI (Graphical User Interface) client component and a SLAT server component. The SLAT GUI client component, or means for guiding a user through SLAT tasks in an automated manner, is designed as a "wizard" that interacts with the user and guides the user through the processes to complete the necessary tasks. The SLAT server component, or means for co-ordinating the completion of SLAT tasks, will perform some more intelligent tasks underneath the interface, passing the user inputs on to the NE server, and forwarding the messages received from NE server to the SLAT GUI for presentation to the user.

In the HDX nodal SLAT stage, a pre-physical installation of the bays and shelves has been assumed. It is also assumed that for a newly installed HDX NE, a member of the local SLAT team will connect his craft PC to the HDX LCAP (Local Craftsperson Access Panel) and perform pre-commissioning tests as well as nodal commissioning. After the node has been provisioned external IP Datacomms parameters and connected to the customer data network, the SLAT team at a centralized location may start to run nodal testing tools through the SLAT Assistant. Alternatively, the local SLAT team can perform the nodal tests if they wish. Each team will have the same SLAT GUI application software installed on a client PC. This client PC may be a craft PC or GUI desktop for the main control center software, element management system (EMS), or a simple client computer.

Figure 3:
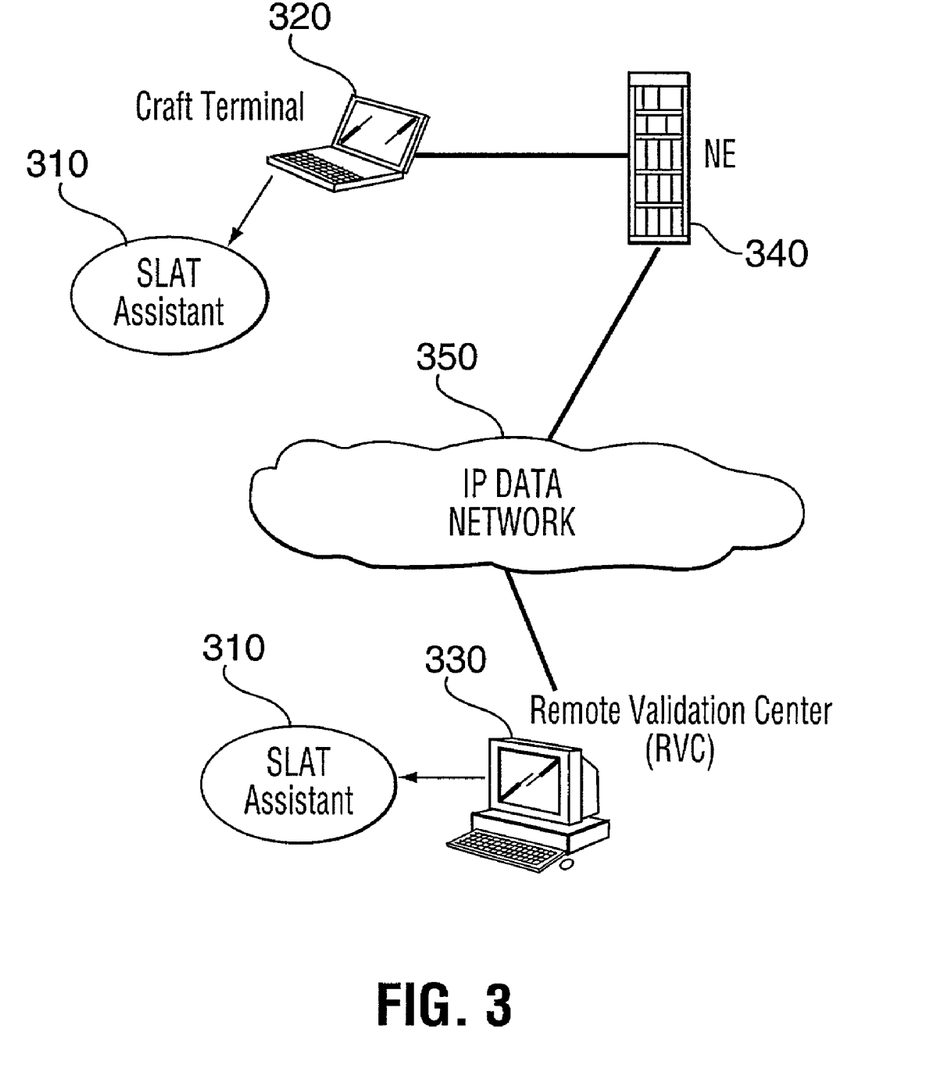
FIG. 3 illustrates client access to the NE node according to an embodiment of the present invention.

Referring now to FIG. 3, a user may execute SLAT Assistant 310 on a local craft terminal 320, such as a laptop, or at a PC or workstation located at a centralized location, such as Remote Validation Center 330. The SLAT Assistant 310 can connects into NE 340 directly via Ethernet or similar connection, as in the case of craft terminal 320. Alternatively, the SLAT Assistant 310 can connect to the NE 340 via a customer data network 350, as in the case of Remote Validation Center 330. Users are presented with the same options when they connect by different means, and the user interface will preferably have the same look and feel for all users.

In terms of configuration, in a preferred embodiment of the present invention, both the client and server components of the SLAT Assistant are installed on a single craft PC. This craft PC would communicate directly with any NEs requiring SLAT. In such a case, the client and server computers could be described as being integral with one another. In an alternative embodiment, the client component of the SLAT Assistant is installed on a client computer, whereas the server component of the SLAT Assistant is installed on a separate server computer. Other functional distributions, such as peer-to-peer distribution, of the SLAT Assistant components on network computers may alternatively be implemented.

For SLATting an in-service HDX node (e.g. adding a new shelf, or a quadrant, or a card), SLAT can be performed either locally at a craft PC or remotely at a Remote Validation Center (RVC).

With respect to the SLAT Assistant according to an embodiment of the present invention, the following advantages may be realized: showing users all steps relating to tasks, with an appropriate level of task granularity; allowing users to skip tasks if necessary and return to them later or carry out tasks in a different order than normal, ensuring that essential tasks are completed in proper sequence; enabling a user to discontinue, resume and continue an incomplete SLAT task or session; reminding a user to complete a non-completed or incomplete task, ensuring that a critical step is not omitted without triggering a warning; enabling a user to review and modify a complete SLAT task or session; enabling local and remote SLAT activities; providing a common user interface is presented at an apparatus capable of performing local SLAT activities and at an apparatus capable of performing remote SLAT activities; providing a user interface to allow a remote user to carry out certain SLAT tasks in parallel with other SLAT tasks being performed.

Examples of SLAT Tasks that may be performed are listed below, with optional tasks being indicated by an asterisk (*)

Install SLAT Assistant
Perform Power-up Procedure
Connect PC to HDX
IP Datacomms parameters provisioning (Connect to data network)
Enter NE Specific Data
Download HDX Software
Install HDX Software
Perform Site Tests*
Perform Site Backplane Extension Tests*
Provision HDX
Review SLAT Results*

Among the advantages provided by embodiments of the present invention, an apparatus according to an embodiment of the present invention comprises means for coordinating the completion of a first set of performed SLAT tasks with a second set of SLAT tasks, both sets of SLAT tasks being part of the same SLAT session, such that essential tasks in said SLAT session are completed in proper sequence and some tasks of said SLAT session are performed in parallel. Such co-ordination enables a user to make better use of time spent on SLAT and permits both local and remote users to perform certain tasks in a controlled manner in which each party is preferably made aware of the status of other tasks being performed.

With respect to navigation in the user interface, an embodiment of the present invention advantageously provides the ability to: show all tasks and sub-tasks in tree; provide a Back button as a means of returning to the previous step; and provide a Next button as a means of proceeding to the next step.

With respect to remote SLAT, an embodiment of the present invention advantageously provides the ability to: show the same UI to local and remote users; and only allow remote users access to certain tasks that can be performed remotely. An embodiment of the present invention may advantageously provide a GUI component such that anyone can access a current task status at any given time. This may be accomplished by, for example: showing tasks being carried out by another user as locked (pad lock icon); disabling tasks that are locked out (grey); allowing either user to override the lock-out and bump the other user (e.g. if connectivity is lost during SLAT). In this manner, the present invention restricts access to SLAT tasks depending on user permissions.

In terms of the specific means employed to provide access to remote users, and to multiple users in general, an embodiment of the present invention advantageously utilizes two data files: a NE specific initialization file (SLAT.ini) and a SLAT session, or report, file (SLAT.rep). An alternative to the NE specific initialization file is to provide default values that will be built-in to the system and will not be NE specific.

In the case of using the NE specific initialization file (SLAT.ini), the file will preferably be in ASCII format. The initialization file provides default system information for SLAT. This information can be used to compare the expected system configuration (i.e. number of port cards and I/O shelves) to the observed system delivered by the equipment provider.

The initialization file can be completed before the equipment is shipped by an equipment provider customer service representative or by an expert SLAT user before the beginning of SLAT. The presence of this initialization file provides inexperienced SLAT users with sufficient information in order to be able to correctly provision a network element, such as an HDX NE.

The initialization file may preferably be supplied to the customer on a floppy disk or other such computer-readable medium, and copied to a directory (such as C:\SLAT) when installing the SLAT Assistant. A backup copy will be made in another directory (such as C:\SLAT\NEid\). For each different NE there will be a different directory in which to store its SLAT.ini backup data. The SLAT.ini will preferably include: an NE Serial Number that is printed on the HDX core, NE ID, TID, NE alias, NE location, NE role, Facility mode, Catalog name (release name), default external NE IP address for access by the craft PC, IP provisioning parameters, number of I/O shelves and card type in each slot, etc. The SLAT.ini file will be updated with the data that the user enters at the NE commissioning step. As a precaution, a backup copy of the SLAT.ini may be made before the user starts a SLAT session.

There is, however, a possibility that the wrong initialization file may be used. The SLAT Assistant may, therefore, preferably ensure that the user does not accidentally use a wrong SLAT.ini file (e.g., an outdated initialization file or a file written for a different HDX NE or previously installed HDX). In such a preferred embodiment, the SLAT Assistant may validate the file by comparing the NE Serial Number in the initialization file to the Serial Number of the network element, or HDX core. For example, on the start up of the SLAT Assistant, the Assistant pops up the Serial Number obtained from the SLAT.ini to the user and asks the user to verify it. Alternatively, this task may be performed automatically by the software.

The SLAT session, or report, file (SLAT.rep) will be created automatically after the SLAT Assistant is started and is preferably stored in the same directory as the SLAT.ini file (e.g. C:\SLAT\). Once again, a backup copy will preferably be made in the same other directory (e.g. C:\SLAT\NEId\). All the steps carried out during SLAT and the results associated therewith will be recorded in the report file. This SLAT.rep file is NE specific and identified by the TID found in the file.

This report file, or portions thereof, are transferred back and forth from/to an NE during SLATting. For instance, a portion of the file identifying changed values may be sent from the NE, as opposed to sending the entire file, whereas the entire file may be sent to the NE. Apart from eliminating hardcopy SLAT forms by storing SLAT test results on the system, this file will also advantageously be used for synchronizing multiple SLAT users.

There is, however, a possibility that transferring a SLAT report file from a client PC to a NE by FTP may cause a security concern. The present invention may preferably avoid this potential problem by requesting the NE to retrieve the SLAT.rep file from the SLAT server platform, using FTP (or HTTP). SLAT.rep can also be sent to the NE via TL1 interface. However, the transfer of files with TL1 is often inefficient and increases the TL1 traffic.

The SLAT Assistant is a client application that accepts user inputs and displays information from the NE. The SLAT Assistant is preferably written in Java, which will run on a client host computer, although any other suitable programming language/environment may be used.

The SLAT Assistant may be run on a standalone craft EMS terminal platform as well as on an EMS desktop. The Assistant application is designed in such a way that it can be run either with or without presence of the EMS server. As such, the SLAT Assistant of the present invention has been designed as preferably comprising two components:

SLAT GUI

SLAT server component

Figure 4:
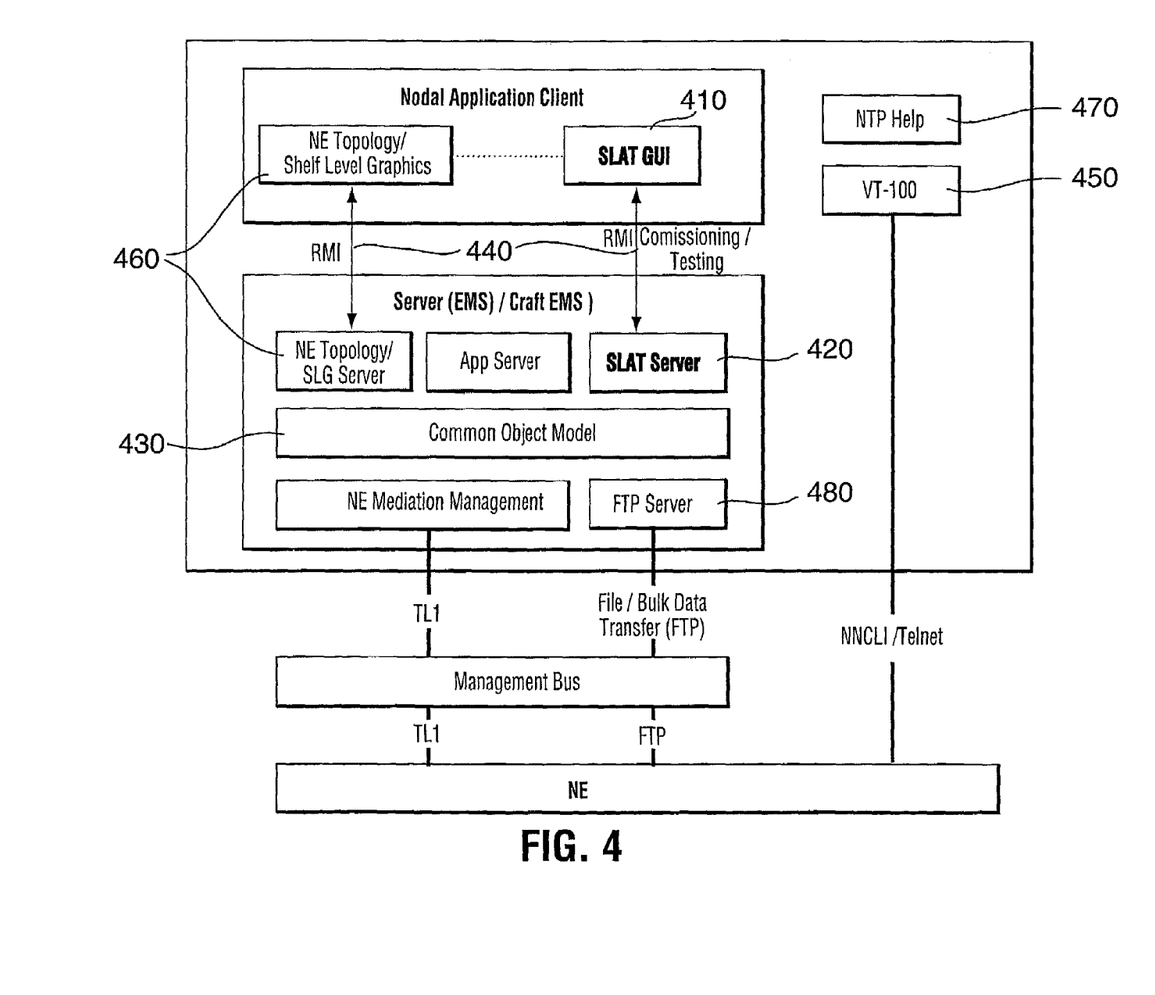
FIG. 4 illustrates the high-level architecture design of a SLAT Assistant according to an embodiment of the present invention.

FIG. 4 illustrates an example of the high-level architecture design of a SLAT Assistant according to an embodiment of the present invention.

SLAT GUI

SLAT GUI 410, or Wizard, is a thin client application that will be deployed on the client PC (craft PC or EMS GUI). Only at runtime does the SLAT GUI application 410 know if the EMS server is in craft mode or not.

The Craft EMS server contains only a subset of all EMS server applications. One of the main differences between craft EMS server and the EMS server is that the database is removed and replaced by an in-memory cache of the data. All data modeled and stored in the cache is lost when the user logs out of a NE or the EMS craft server is restarted. Therefore, when the SLAT Assistant is designed to take care of an incomplete SLAT session after restart, the SLAT Assistant has to know where to obtain the information on the incomplete SLAT session. In an embodiment of the present invention, the SLAT Assistant will create a "Report File" on the client PC the first time that a user starts the SLAT session. The Report File will continue to be updated as SLAT proceeds. By examining the Report File, the Wizard will be able to detect whether there is an incomplete SLAT session left.

To access the craft EMS server, a set of default user profiles is preferably used for access control. A user profile will correspond to the user's TL1 access level. User authentication is performed at the NE level. User authentication in this case is performed at the EMS level.

SLAT Server Component

SLAT server component 420 is the SLAT application server that will be deployed together with other server applications on the craft EMS platform (or EMS platform). The SLAT server component runs in the same virtual machine, e.g. Java Virtual Machine (JVM), as Common Object Model 430. It provides the RMI (Remote Method Invocation) interface 440 to the SLAT GUI 410.

During application execution, the SLAT GUI 410 will invoke a remote method on the remote object defined in the SLAT server component. The SLAT server component 420 is an "NE Proxy" on the craft EMS server for the SLAT GUI to send/receive messages to/from the NE server for NE commissioning and testing.

The SLAT server component 420 is a layer built on top of the Common Object Model 430 to create a SLAT object that holds a summary of SLAT information. The SLAT GUI 410 extracts information from the SLAT object and preferably displays it on a display means, such as a display screen.

Except for VT-100 450 access to the NE, all communications between client PC and the NE are performed via the SLAT server component. This is a typical tree-tier client/server model.

Advantages of the proposed SLAT GUI/SLAT server component architecture are:
- Software maintenance: If further features or enhancements are developed for the NE or EMS, such as IP Datacomms parameters provisioning with TL1, then only the SLAT server component needs to be upgraded and the SLAT GUI remains unchanged.
- Communication efficiency: The SLAT server component has the intelligence that collects the summary information required by the SLAT GUI, and as such, the RMI overhead will be reduced considerably.

RMI overhead may not be a significant concern for the craft EMS terminal application that runs on the same platform that the server runs on. However, if the client application runs on the EMS GUI and the server application runs on the EMS server, the RMI overhead will degrade the network performance.

During integration exercises, it was discovered that GUI applications (NE Topology and Shelf Level Graphics) that access to COM 430 directly via RMI interface 440 could take a painfully long time to start. A number of solutions have been provided. One of these solutions is to limit unnecessary large class (such as the Common Object Model) exposure to the client application. One way to limit class exposure and remote method invocation is to create a remote proxy that limits access to only the class structures and methods that will need to be accessed remotely. The remote proxy interface should not be included as part of the Common Object Model since it will be addressed on a UI case-by-case basis.

SLAT GUI is a candidate for creating a remote proxy interface. It requires some simple NE information such as NE type, NE ID, shelf information (number of shelves, shelf types (Core, I/O), etc), shelf configuration (type of card in each slot), NE entity (shelf/quad/slot) mode (SLAT mode, in-service mode, etc), and events generated for site testing results (pass, fail, incomplete) and methods supporting SLAT requests (software upgrade, upload files, site testing cmds, etc). Creating a proxy definition that runs on the same JVM as the Common Object Model and summarizes the information required by the SLAT GUI will reduce the RMI overhead considerably. Likewise, more "UI business logic" implemented on the server side would contribute to reducing the amount of data that needs to be transferred across the network.

It is believed that using the above strategy would help control the RMI costs and allow the desktop to run more efficiently over slower speed data communications links.

Common Object Model

SLAT server component 420 will invoke local methods defined in the Common Object Model (COM) 430. The COM defines abstraction and storage and EMS data in support of nodal and networked applications. It models each NE's physical or logical entity as an encapsulated object, e.g., a shelf or an alarm.

The COM 430 interacts with Lumos translation/mediation and event management components (NE Mediation Management) for communication to the NE in the following tasks:
- Send/receive TL1 messages to/from NE;
- Receive NE events; and
- Retrieve shelf-description data.

The SLAT Assistant will also utilize the following functionalities supported by the COM:
- Interact with NE discovery component to retrieve NE's data files;
- Provide application interface (local and RMD to access NE; and
- Provide event notification for object model.

NE Topology

NE Topology/Shelf Level Graphics component 460 provides a shelf map for multi-shelf NEs. Support for shelves, the physical relationships between the shelves, and alarm displays (for logged in NE only) will be provided.

Changes to shelves or NE configuration will automatically be reflected in the NE Topology GUI 460. For example, the addition of a shelf to an NE will result in a graphical view update with a new shelf, POI connectivity, and alarm status.

In addition to the above, from the NE Topology GUI 460, the user can also launch Shelf Level Graphics and the Menu Driven TL1 UI.

The primary usage of launching the NE Topology GUI 460 from the SLAT Assistant is to display SLAT alarms at the shelf level and to launch the Shelf Level Graphics from the NE Topology GUI 460 to display SLAT alarms at the slot level.

The Menu Driven TL1 will be launched from the NE Topology GUI in certain cases to support launching scripts. This is provided to allow any last minute changes that the SLAT Assistant may have forgotten and provide users the ability to customize customer setups.

Shelf Level Graphics

The NE Topology GUI 460 will provide a graphical view of multi-shelf NEs while Shelf Level Graphics is available for single shelf NEs. Shelf Level Graphics (SLG) will be launched from the NE Topology GUI 460 during site testing.

Shelf Level Graphics is a nodal surveillance function that provides users a photo realistic view of shelves on a specific NE. Many functions are supported by the SLG. The main functionality of the SLG that will be used by the SLAT Assistant is to display the SLAT alarms on the NE shelf faceplate and to access the properties panel against selected alarm.

The NE Topology and the SLG are among the few exceptions in the SLAT Assistant in that they will be using their own defined UI. Another exception is the NTP online Help system 470. The rest of the tasks supported by the SLAT Assistant will be wizard like UI developed by the SLAT feature.

VT-100 Emulator

The SLAT Assistant will provide the function to access a VT-100 emulator 450 developed for the craft EMS platform. The VT-100 Emulator 450 is a client side application that provides a character-based terminal for access to the TL1/CLI (interfaces of legacy NEs.

The purpose of accessing the VT-100 Emulator 450 is to provide users a way to connect to and manage a legacy NE, in case there is a bandwidth limitation or to debug a problem on the NE. In cases where some new CLI (Command Line Interface) test tools have been developed for the NE but the SLAT Assistant does not have time to upgrade, the VT-100 emulation tool will provide a user with a way to access these test tools.

The other use of the VT-100 emulator in the SLAT Assistant is to communicate with the NE in case the only communication channel is through CLI, such as IP Datacomms parameters provisioning for the HDX NE.

NTP Help

SLAT Assistant will allow users access to online help 470 in the form of Notices to Proceed (NTPs) or procedural instructions for software tasks. The help system developed for the EMS GUI Desktop, which provides the context-sensitive online Help system, will be launched from the SLAT Assistant.

File Transfer To support file transfer, it is assumed that EMS server and/or the craft EMS server shall have an FTP server 480 installed. However, for the EMS user, the client PC may or may not have the FTP server installed on it. Therefore, to send files (such as the SLAT.ini and the SLAT.rep) to the NE, the files will have to first be sent to the EMS server via RMI call, and from the server files can then be transferred to the NE. To receive files from the NE, the files will first be transferred to the EMS server, and then the client PC will obtain the files from the server via RMI call. Alternatively, the client PC can retrieve the file directly from the NE with FTP.

In the case of the SLAT Assistant running on the craft EMS terminal, both the server applications and the client applications run on the same platform and therefore there is no need to make the RMI call for the file transfer.

To send a file to the NE, the SLAT server component will send a TL1 message to the NE with the source location and the file to be transferred. The NE server will then retrieve the file from the source using FTP protocol. This approach is used to prevent security leaks on the NE server.

To transfer a file from the NE to the craft EMS/EMS server, however, there are two alternatives: the NE "puts" the file to the server, or the server "gets" the file from the NE by the FTP protocol.

With respect to the NE putting the file to the EMS (or craft EMS) server, an advantage is that the user does not have to know the file's location on the NE. However, a disadvantage is that the EMS server has to send a file transfer request to the NE via TL1 interface before the NE can put the file onto the EMS server. Allowing the NE to put files on the EMS server by FTP may open a door for security leaks.

With respect to the EMS (or craft EMS) server retrieving the file from the NE, an advantage is that the EMS server does not need to send a TL1 file transfer request to the NE before retrieving the file. The EMS server security is thus protected. However, a disadvantage is that the user has to know the file location on the NE before retrieving the file.

A preferred embodiment of the present invention requests the NE put the file on to the EMS (or craft EMS) server in order to accomplish such file transfer.

The EMS (or craft EMS) server will cache the data files (SLAT.ini and SLAT.rep) on its file system. In order to keep these files together, a separate directory may be created per NE to store the cached and override files pertaining to that NE.

When a NE exits the SLAT mode, these files, along with the directory, will be removed from the EMS server. In a preferred embodiment, the directory name will be the NE identifier string provided by the NE ID in the SLAT.ini.

However, if the SLAT Assistant runs on the craft EMS platform, the files will be kept on the local file system after the NE exiting the SLAT mode until the user manually removes them.

IP Parameters Provisioning

The EMS platform communicates with the NE using a TL1 interface. Ideally, IP Datacomms parameters provisioning for the HDX NE should be effected with the TL1 protocol from the software architecture and maintainability point of view. However, since NE server does not always support IP parameters provisioning with TL1, two alternatives are: IP parameters provisioning with CLI TCP/IP socket; and IP parameters provisioning with VT-100 Emulator.

With respect to IP parameters provisioning with CLI TCP/IP socket, an advantage is that the user will have the same look-and-feel user interface as other SLAT tasks. The user will not be affected by the implementation of the IP parameters provisioning protocol. However, a disadvantage is that a separate TCP/IP socket needs to be opened for IP parameters provisioning whereas the rest of the communications are effected with TL1. If future releases of TL1 support the IP provisioning, then SLAT will need to update this feature accordingly.

With respect to IP parameters provisioning with VT-100 Emulator, an advantage is that there is no development work needed for the SLAT Assistant for provisioning IP parameters. However, a disadvantage is that users will not get the same look-and-feel user interface as other tasks. Users have to know the CLI command for IP parameters provisioning.

A preferred embodiment of the present invention provisions the IP parameters with CLI TCP/IP socket, pending the development of resources.

Server Applications

The SLAT Assistant will directly utilize many applications on the craft EMS server, such as:
  SLAT server component
  Craft Access Control
  Common Object Model
  Lumos TMS and TL1 Interface
  NE Topology
  Shelf Level Graphics
  Logging and Tracing
  FTP server Client Applications The SLAT Assistant will directly utilize the following client applications:
  SLAT GUI
  NE Topology GUI
  Shelf Level Graphics GUI
  VT-100 Emulator terminal
  Online Help System The SLAT GUI shall be able to run even if the rest of the client applications above are not installed. However, in that case, the services provided by them will not be accessible to the user.

File Transfer Interaction

This section describes the interactions between the SLAT Assistant and the HDX NE during file transfer.

Two files will be needed to coordinate multiple SLAT activities related to the same SLAT session, or to co-ordinate multiple SLAT sessions: SLAT.ini (SLAT Initialization file) and SLAT.rep (SLAT report file). The files will preferably be in XML format, although other formats may alternatively be used.

SLAT.ini

SLAT.ini will be pre-prepared by a SLAT utility tool. Upon start up of the SLAT Assistant, if the Wizard cannot find the file on the client PC, it will create a new one.

SLAT.ini will be used to provide default values of the SLAT Assistant data fields and options. SLAT.ini will be updated if the user makes changes on the data fields and options in the Wizard. The SLAT.ini will be NE specific. It does not contain any user information (such as userid, password and craft EMS IP address, etc). Therefore, all the users connected to the NE will use the same SLAT.ini file.

SLAT.ini will be transferred to the NE from the craft EMS terminal upon completion by the craft user of the NE commissioning/provisioning step (this step will be performed by the craft user only).

The craft EMS server sends a TL1 message to the NE and tells the NE where to download the SLAT.ini. The NE then downloads the SLAT.ini from the craft EMS with FTP. A remote client PC will then download SLAT.ini from the NE with FTP after the user logs into the NE.

SLAT rep

SLAT.rep will be created upon the craft user starting up the SLAT Assistant. SLAT.rep will be updated after each task is completed and will be transferred to the NE after the craft user logs into the NE.

The craft EMS server sends a TL1 message to the NE and tells the NE from where to download the SLAT.rep. Then, the NE downloads the SLAT.rep from the craft EMS with FTP. Remote client PC will then download SLAT.rep from the NE with FTP after the user logs into the NE.

Both the craft user and the remote user can update the SLAT.rep file and transfer the SLAT.rep file to the NE after it is updated. Before the users update the SLAT.rep file, they should retrieve the latest version of SLAT.rep from the NE and update the latest version. After the SLAT.rep file is updated, the file is sent to the NE right away.

The SLAT.rep should preferably be made available to the client even after exiting SLAT mode. SLAT.rep will preferably be in ASCII format, however the NE should not be concerned with the contents of the file.

It is up to the client (SLAT Assistant) to interpret the contents of the report file. To avoid collisions, each client only appends his completed task to the SLAT report file.

Interface Design

The user interface for a SLAT apparatus according to an embodiment of the present invention facilitates the automation of the SLAT process, while providing a means by which a user may be guided through the SLAT process. The user interface also facilitates the coordination of the completion of a plurality of sets of SLAT tasks constituting part of the same SLAT session, such that essential tasks in said SLAT session are completed in proper sequence and some tasks of said SLAT session are performed in parallel. Preferably, the user interface provides graphical access to a software assistant (wizard) that guides the user through the various phases of SLAT in an automated fashion, while ensuring that no critical step is omitted without displaying a warning.

Figure 5A:
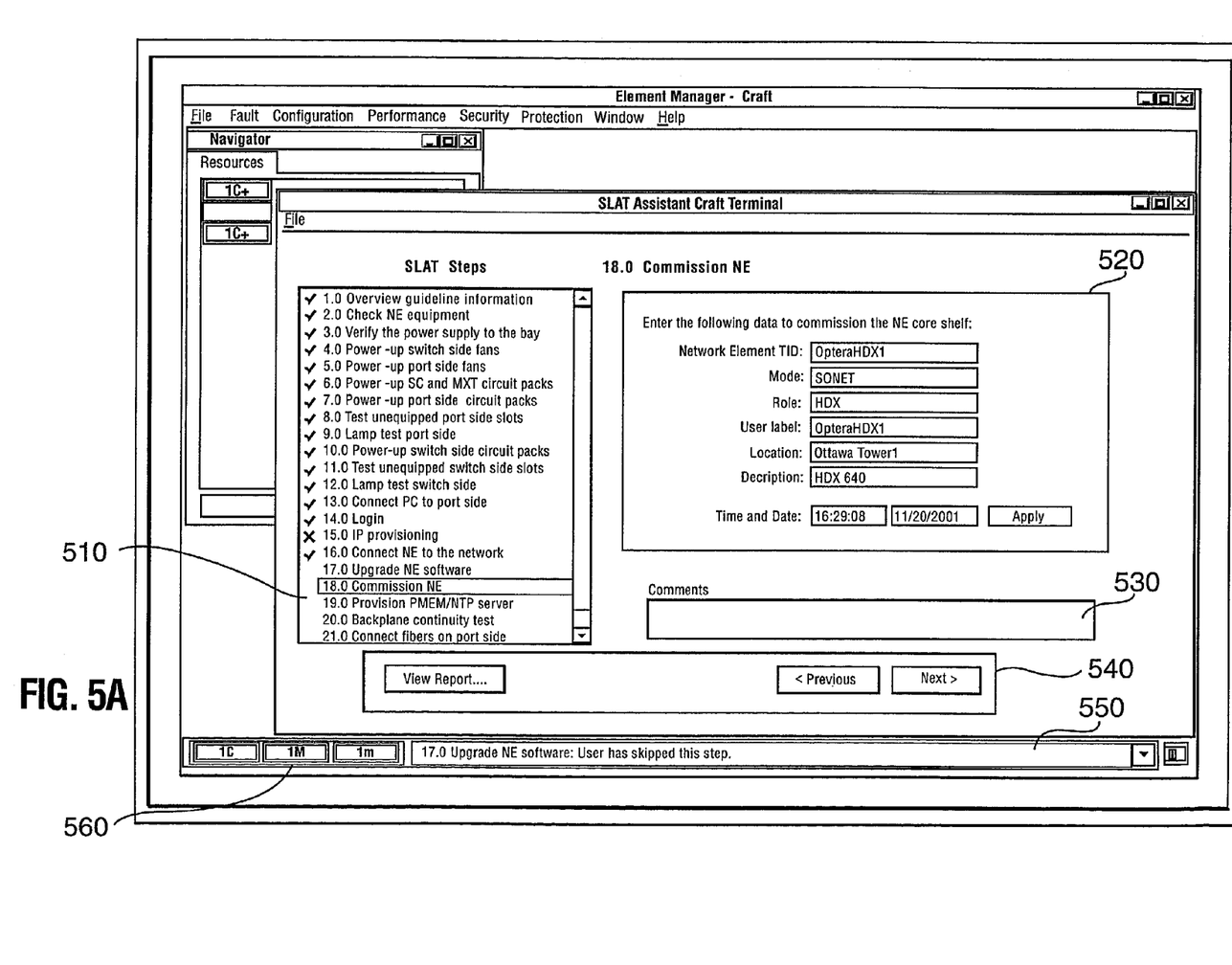
FIGS. 5A & 5B illustrate representative screen shots of a user interface in accordance with an embodiment of the present invention.
Figure 5B:
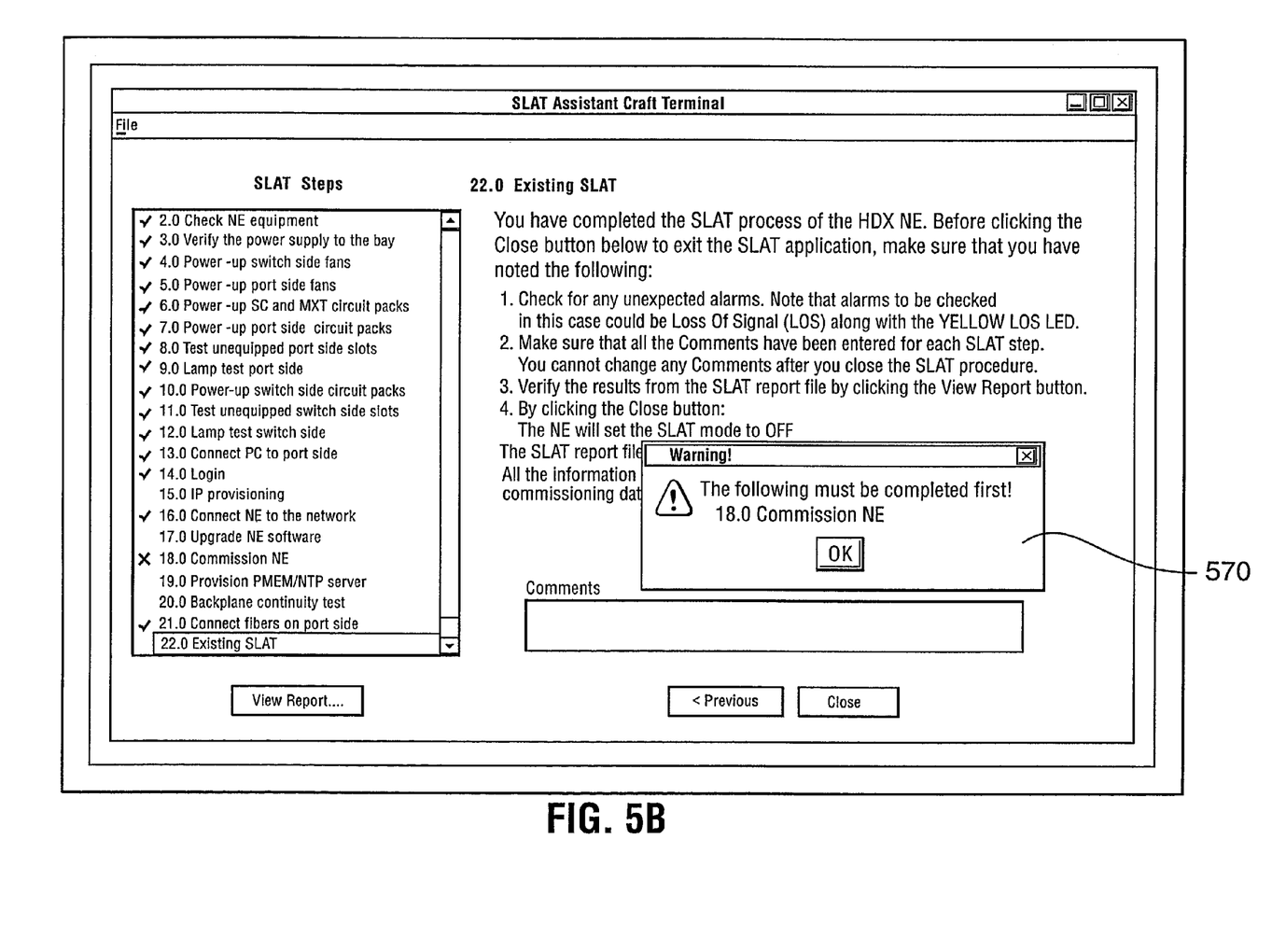

FIGS. 5A and 5B illustrate representative screen shots of a user interface in accordance with an embodiment of the present invention. The figures illustrate the manner in which tasks are presented to a user, including a tree view that provides an indication of previous and upcoming tasks, as well as an indication of which tasks are already completed and the hierarchy of such tasks. This tree view can be seen on the left-hand side of the screen shots.

FIG. 5A illustrates a screenshot of an example of SLAT step 18.0, the step of commissioning a network element. Task area 510 of the user interface includes an identification of each of the SLAT steps, as well as an indication of the state of completion thereof. In this particular example, a checkmark is placed beside steps that have been completed. An "X" is placed beside essential steps that have been skipped (otherwise referred to as non-completed), whereas no indication is placed beside non-essential steps that have been skipped, such as step 17.0. Instruction area contains any instructions necessary in order for a user to perform the current task. In many instances, the instruction area 520 contains non-interactive text instructing the user on what steps to perform. However, FIG. 5A provides an example of advanced options that may be provided in the instruction area 520, such as fill-in boxes, pull-down menus, and other such means for selecting and/or inputting relevant information. Comment area 530 is provided for a user to enter observations and comments regarding the completion of a given task. Task button area 540 contains navigation buttons allowing a user to go to previous and next tasks, and to view a report of all SLAT tasks in a particular SLAT session. Other alternative functions that may be provided in the task button area 540 include obtaining help (context-sensitive or general help) and saving a SLAT session for later completion. Status message area 550 is provided for the SLAT Assistant to provide status messages to the user. In FIG. 5A, a status message is given regarding the fact that the user has skipped the previous step. As mentioned above, because it is a non-essential step, there is no "X" beside step 17.0 as there is beside essential step 15.0 that was skipped in this example. Finally, alarm area 560 provides an indication of any alarms, alerts, errors or warnings that may be applicable at any point in time during SLAT. In this example, there is an indication of one error in each of the critical, major and minor categories.

FIG. 5B illustrates an example of a warning indication 570 according to an embodiment of the present invention. In this example, the warning indication 570 comprises a pop-up window that indicates the applicable warning. This particular warning has popped up due to the fact that a user attempted to exit SLAT before an essential task was completed. Other instances causing warnings may include, for example: proceeding to a subsequent step when an essential step has not yet been completed; inputting values in an incorrect format; confirmation of proceeding with a requested task; confirmation of completion of a task; and any other informational message or error message associated with the execution of the SLAT tasks. The term warning is used herein to represent any type of alarm, error, alert or any other notification intended to report a deviation from an expected value or result.

The following features are advantageously provided by the user interface in a preferred embodiment of the present invention:

Navigation tree: Users may navigate among tasks by selecting items in the navigation tree.

Mandatory tasks: Tasks that must be performed in order are represented in distinctive text, e.g. plain text (not underlined), as numbered parent nodes in the tree.

Available tasks: Tasks are enabled (represented, for example, by a black font) in the tree when they are available.

Unavailable tasks: Tasks are disabled (represented, for example, by a gray font) in the tree when they are not available.

Subtasks: Tasks that may be performed in any order are represented as child tasks and may be numbered as subcomponents (e.g. 1.1, 1.2, etc.).

Multiple users: Remote users are represented in the navigation tree. An icon may be displayed in the tree beside the task the remote user is actively carrying out.

Completed tasks: A checkmark, or a similar indicator, may be displayed in the tree beside tasks that are complete.

The following user behaviors are advantageously enabled by the user interface in a preferred embodiment of the present invention:

Skipping tasks: Tasks that can be skipped may be highlighted with blue underlined text (hyperlinks), or any similar indication, in the task tree. Users can skip tasks using the "Next" button or by clicking the next item in the navigation tree, or performing a similar step.

Performing tasks in a different order: Users may click hyperlinks in the navigation tree to perform tasks in a different order than originally anticipated.

Reviewing complete tasks: Users may review tasks that are complete by selecting nodes in the tree.

Modifying complete tasks: Users may review tasks that are complete by selecting nodes in the tree, modify the task contents, and click the "Next" button to apply changes. After the user clicks "Next", a dialog may pop-up indicating that changes have been made and the user may have the option to apply changes or cancel.

Previewing tasks: Users may click unavailable tasks in the tree to preview the task requirements. The "Next" button is disabled (represented by, for example, a gray font) when a selected task is unavailable.

Embodiments of any of the aspects of the present invention can be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server over the network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product). For example, in a method according to an embodiment of the present invention, various steps may be performed at each of a craft PC, client computer, or server computer. These steps may be implemented via software that resides on a computer readable memory located at each of said craft PC, client computer, or server computer.

Although various exemplary embodiments of the invention have been disclosed, it should be apparent to those skilled in the art that various changes and modifications can be made which will achieve some of the advantages of the invention without departing from the true scope of the invention.

What is claimed is:

1. An apparatus for automating system lineup and testing (SLAT) for a network element, the apparatus comprising:

a SLAT server component in communication with the network element, the SLAT server component automatically determining and coordinating the performance of SLAT tasks in a SLAT session to complete the SLAT tasks in proper sequence based on default system information provided to the server component and a status of SLAT tasks performed in the SLAT session; and a SLAT graphical user interface component to receive and display a current SLAT task identification and status information to a user, and to guide the user through the SLAT tasks in an automated manner including, in response to a user selecting a SLAT task for completion, providing a warning indication when performance of the selected SLAT task is outside the proper sequence determined by the server component, and providing instructions for the selected SLAT task when the selected SLAT task is in the proper sequence.

2. The apparatus of claim 1, wherein the default system information is stored in a SLAT initialization file.

3. The apparatus according to claim 2, wherein the server component comprises means to validate the SLAT initialization file by comparing a network element serial number in the SLAT initialization file to a serial number of the network element.

4. The apparatus according to claim 2, wherein the SLAT initialization file comprises a set of built-in default values stored in memory within the apparatus or the network element.

5. The apparatus according to claim 1, wherein the server component comprises means to coordinate a subset of the SLAT tasks to be performed in parallel.

6. The apparatus according to claim 1, wherein the server component comprises means to pass user input, entered via the graphical user interface, to the network element.

7. The apparatus according to claim 1, wherein the server component creates a SLAT report file to provide the status of SLAT tasks.

8. The apparatus according to claim 7, wherein the SLAT report file includes an identification of completed SLAT tasks and results associated with the SLAT tasks performed in the SLAT session.

9. The apparatus according to claim 8, wherein the SLAT report file includes a completion status of the SLAT tasks performed in the SLAT session.

10. The apparatus according to claim 1, wherein said SLAT server component comprises means to enable a user to discontinue, resume and continue an incomplete SLAT task or session.

11. The apparatus according to claim 10, wherein the server component comprises means to determine that omission of a non-completed or incomplete task will trigger a warning indication, and means to display, via the graphical user interface component, a reminder to the user to complete the non-completed or incomplete task.

12. The apparatus according to claim 11, wherein the means to determine includes means to report an error in the SLAT session.

13. The apparatus according to claim 1, wherein the server component comprises means to enable a user to review and modify a complete SLAT task or session.

14. The apparatus according to claim 1, wherein the graphical user interface component comprises means to graphically display tasks and sub-tasks in a tree.

15. The apparatus according to claim 1, wherein the server component comprises means to enable local and remote SLAT activities.

16. The apparatus according to claim 1, wherein the server component comprises means to restrict access to selected SLAT tasks depending on user permissions.

17. The apparatus according to claim 1, wherein the server component comprises means to update the status of SLAT tasks performed in the SLAT session.

18. The apparatus according to claim 1, wherein the network element includes a high-density cross-connect optical core and a high-density cross-connect optical input/output shelf.

19. A method for automating system lineup and testing (SLAT) for a network element, comprising:
receiving default system information related to a network element;
determining a proper sequence to complete the SLAT tasks based on default system information and a status of SLAT tasks performed in a SLAT session;
coordinating performance of the SLAT tasks in accordance with the proper sequence; receiving and displaying a current SLAT task identification and status information to a user;
guiding the user through the SLAT tasks in an automated manner including, in response to a user selecting a SLAT task for completion, providing a warning indication when performance of the selected SLAT task is outside the proper sequence in accordance with options defining correct performance of the SLAT session, and providing instructions for the selected SLAT task when the selected SLAT task is in the proper sequence;
updating the status of the SLAT tasks in response to completion or non-completion of the selected task; and
updating the proper sequence to complete the SLAT tasks in response to the updated status of the SLAT tasks.

20. The method according to claim 19, wherein receiving the default system information comprises obtaining a SLAT initialization file from the network element.

21. The method according to claim 20, wherein the SLAT initialization file contains the options defining correct performance of SLAT for the network element.

22. The method according to claim 20, wherein obtaining the SLAT initialization file comprises creating said initialization file.

23. The method according to claim 19, wherein the status of the SLAT tasks is stored in a SLAT report file containing an identification of performed SLAT tasks and results associated therewith.

24. The method according to claim 23, wherein the SLAT report file includes a completion status.

25. The method according to claim 23, wherein updating the status of the SLAT tasks comprises automatically updating the contents of the SLAT report file once the selected SLAT task is completed.

26. The method according to claim 25, further comprising transmitting the updated SLAT report file to the network element.

27. The method according to claim 23, further comprising transferring the SLAT report file to the network element after a user logs in to the network element.

28. The method according to claim 19, further comprising initializing the network element.

29. The method according to claim 19, further comprising making the updated SLAT report file available to multiple users.

30. Computer-readable media having stored thereon instructions, which when executed by one or more processors, cause the one or more processors to perform a method for automating system lineup and testing (SLAT) for a network element, comprising steps of:
receiving default system information related to a network element;
determining a proper sequence to complete SLAT tasks based on default system information and a status of SLAT tasks performed in a SLAT session;
coordinating performance of the SLAT tasks in accordance with the proper sequence; receiving and displaying a current SLAT task identification and status information to a user;
guiding the user through the SLAT tasks in an automated manner including, in response to a user selecting a SLAT task for completion, providing a warning indication when performance of the selected SLAT task is outside the proper sequence in accordance with options defining correct performance of the SLAT session, and providing instructions for the selected SLAT task when the selected SLAT task is in the proper sequence;
updating the status of the SLAT tasks in response to completion or non-completion of the selected task; and
updating the proper sequence to complete the SLAT tasks in response to the updated status of the SLAT tasks.

31. The computer-readable media according to claim 30, wherein receiving the default system information comprises obtaining a SLAT initialization file from the network element.

32. The computer-readable media according to claim 31, wherein the SLAT initialization file contains the options defining correct performance of SLAT for the network element.

33. The computer-readable media according to claim 31, wherein obtaining the SLAT initialization file comprises creating said initialization file.

34. The computer-readable media according to claim 30, wherein the status of the SLAT tasks is stored in a SLAT report file containing an identification of performed SLAT tasks and results associated therewith.

35. The computer-readable media according to claim 34, wherein the SLAT report file includes a completion status.

36. The computer-readable media according to claim 34, wherein updating the status of the SLAT tasks comprises automatically updating the contents of the SLAT report file once the selected SLAT task is completed.

37. The computer-readable media according to claim 36, further comprising transmitting the updated SLAT report file to the network element.

38. The computer-readable media according to claim 34, further comprising transferring the SLAT report file to the network element after a user logs in to the network element.

39. The computer-readable media according to claim 30, further comprising initializing the network element.

40. The computer-readable media according to claim 30, further comprising making the updated SLAT report file available to multiple users.

* * * * *